(No Model.)
T. G. MANDT.
WHIFFLETREE HOOK.
No. 375,644. Patented Dec. 27, 1887.
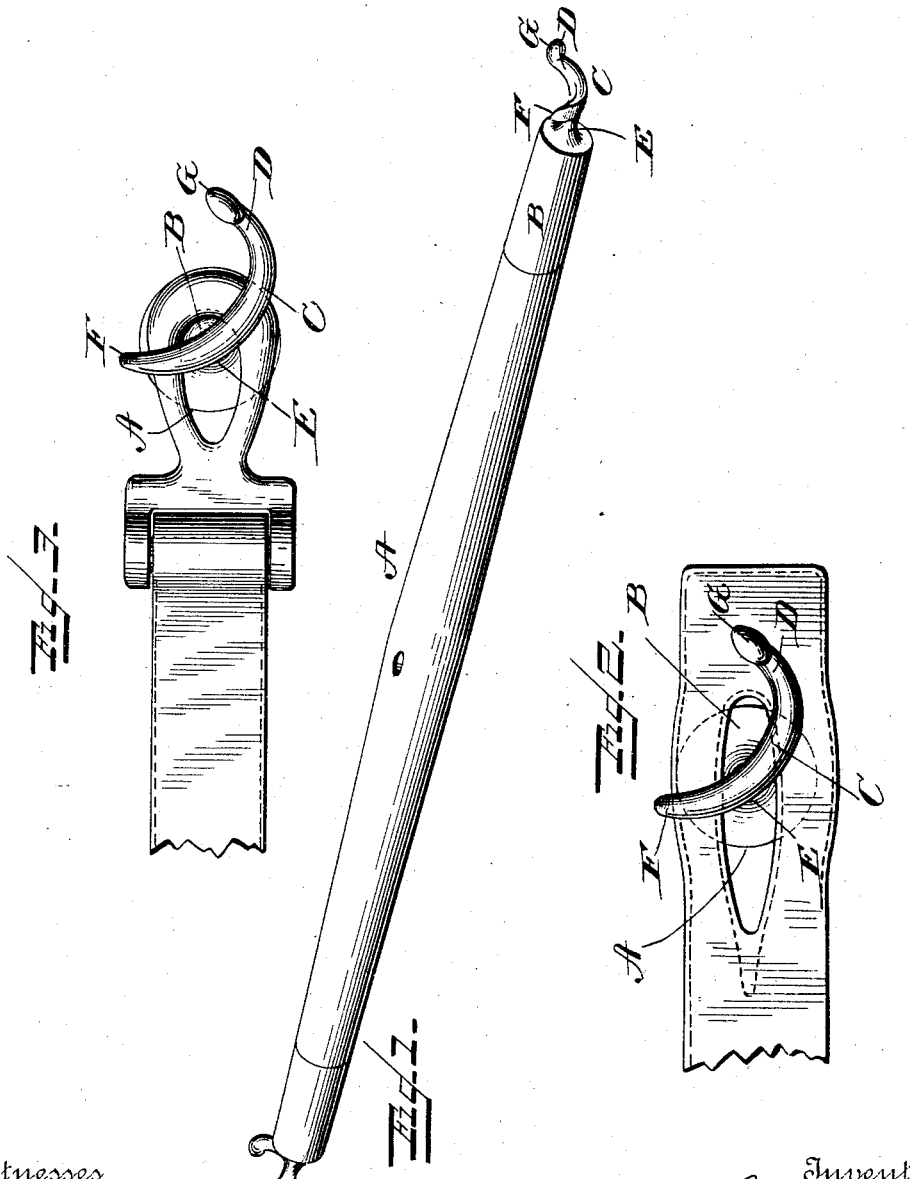

UNITED STATES PATENT OFFICE.

TARGE G. MANDT, OF STOUGHTON, WISCONSIN.

WHIFFLETREE-HOOK.

SPECIFICATION forming part of Letters Patent No. 375,644, dated December 27, 1887.

Application filed September 9, 1887. Serial No. 249,240. (No model.)

*To all whom it may concern:*

Be it known that I, TARGE G. MANDT, of Stoughton, in the county of Dane and State of Wisconsin, have invented certain new and useful Improvements in Whiffletree-Hooks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a whiffletree, showing my new and improved hooks secured to the ends thereof. Fig. 2 is an end view of the same, showing a trace having an elongated eye secured thereto; and Fig. 3 is a similar view showing a trace provided at its end with a cockeye secured to one of the said hooks.

Similar letters of reference denote corresponding parts in all the figures.

My invention has relation to whiffletree-hooks; and it has for its object to construct a hook in such a manner that the end of a trace having an eye formed in its body or provided with the common cockeye may be easily and conveniently attached thereto and securely retained in position.

In the accompanying drawings, the letter A indicates a whiffletree having reduced ends, to which socket-pieces B are attached. Formed upon the outer end of each of these socket-pieces is a crescent-shaped hook, C, the lower rear end, D, of which is of greater length from the rounded shank portion E than the upper forward end, F, and terminates in a stud or ball, G, which projects slightly outward.

It is obvious that the hook and its shank portion may be made independent of the socket piece or ferrule, and in that case the shank portion will be secured in the end of the whiffletree, having an ordinary ferrule to strengthen it and prevent it from splitting.

When it is desired to attach a trace, the eye of the same is passed over the ball or stud at the lower end of the hook and is guided to and upon the rounded shank portion thereof, and in detaching, the trace is raised to an angle of about forty-five degrees, and the eye is then slid over the forward end of the hook and is easily and rapidly guided off the lower end thereof.

It will be seen that persons with benumbed fingers can easily attach a trace to my improved hook, thus obviating the great drawback heretofore experienced with snap-hooks.

From the foregoing description, taken in connection with the accompanying drawings, the operation and advantages of my invention will be readily understood without requiring extended explanation. It will be seen that it is simple and strong in construction, inexpensive to manufacture, and is exceedingly useful for the purpose for which it is designed, while it can easily be attached to any ordinary whiffletree in a moment's time.

Having thus described my invention, what I claim, and desire to secure by Letters Patent of the United States, is—

1. A whiffletree-hook comprising a socket-piece, a rounded shank formed on the outer end of said socket, and a crescent-shaped piece integral with said shank and having its rear lower curved end of greater length than its upper curved end and terminating in an outwardly-extending stud or ball, substantially as and for the purpose herein set forth.

2. In a whiffletree-hook, the combination of the ends of a whiffletree with hooks comprising socket-pieces, shanks projecting from the outer ends thereof, and crescent-shaped pieces integral with said shanks and terminating at their long curved ends with outwardly-projecting studs or balls, substantially as and for the purpose herein set forth.

In testimony that I claim the foregoing as my own I have hereunto affixed my signature in presence of two witnesses.

TARGE G. MANDT.

Witnesses:
B. E. WAIT,
L. K. LUSE.